US010001620B1

(12) United States Patent
 Olsen (10) Patent No.: US 10,001,620 B1
(45) Date of Patent: Jun. 19, 2018

(54) TORQUE COUPLER AND SUPPORT POINT

(71) Applicant: SPAWAR Systems Center Pacific, San Diego, CA (US)

(72) Inventor: Randall B. Olsen, Carlsbad, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days. days.

(21) Appl. No.: 15/379,756

(22) Filed: Dec. 15, 2016

(51) Int. Cl.
| G02B 7/18 | (2006.01) |
| G02B 19/00 | (2006.01) |
| F16D 1/08 | (2006.01) |
| F16D 1/12 | (2006.01) |
| G02B 7/182 | (2006.01) |

(52) U.S. Cl.
CPC ......... *G02B 7/1821* (2013.01); *F16D 1/0829* (2013.01); *F16D 1/12* (2013.01); *G02B 19/0019* (2013.01); *G02B 19/0042* (2013.01)

(58) Field of Classification Search
CPC ........ G02B 5/08; G02B 7/182; G02B 7/1822; G02B 7/183; G02B 19/0019; G02B 19/0042; F16D 1/0829; F16D 1/12
USPC ........ 359/850, 855, 871, 875; 126/600, 607, 126/608
See application file for complete search history.

(56) References Cited

U.S. PATENT DOCUMENTS

| 4,558,770 A | 12/1985 | Woodruff |
| 4,682,865 A | 7/1987 | Rogers |
| 6,129,477 A | 10/2000 | Shoykhet |
| 6,953,038 B1 | 10/2005 | Nohrig |
| 7,554,030 B2 * | 6/2009 | Shingleton ................. F24J 2/38 126/600 |
| 7,557,292 B2 * | 7/2009 | Shingleton ................. F24J 2/04 126/600 |
| 8,033,920 B1 | 10/2011 | Benson |
| 8,136,783 B2 * | 3/2012 | Pietrzak ................. H02S 20/10 126/573 |
| 8,479,724 B1 * | 7/2013 | Olsen ......................... F24J 2/36 126/625 |
| 8,522,772 B1 * | 9/2013 | Olsen ....................... F24J 2/125 126/600 |
| 8,657,454 B1 * | 2/2014 | Olsen ..................... G02B 7/183 359/871 |
| 9,175,877 B1 * | 11/2015 | Olsen ..................... F24J 2/5233 |
| 9,184,324 B2 | 11/2015 | Wares |
| 9,279,457 B2 | 3/2016 | Grushkowitz |
| 9,395,104 B2 | 7/2016 | Grushkowitz |

(Continued)

*Primary Examiner* — Frank Font
(74) *Attorney, Agent, or Firm* — SPAWAR Systems Center Pacific; Kyle Eppele; Young Fei (57) ABSTRACT

A torque tube coupler that rigidly connects reflectors and provides for substantially 360° rotational freedom for the reflectors as well as the ability to transmit rotation from one reflector to another so that the reflectors may essentially be placed at the same angle. The torque coupler includes first and second torque tube coupler assemblies each configured to be connected to a reflector in a solar energy collection system. The torque coupler also includes a support point that supports said first torque coupler assembly and said second torque tube coupler assembly. This support point includes a shaft that facilitates the rigid connection of the first torque tube coupler assembly to the second torque tube coupler assembly and a bearing that facilitates 360° rotation of the first reflector and the second reflector.

14 Claims, 6 Drawing Sheets

(56) References Cited

U.S. PATENT DOCUMENTS

| | | |
|---|---|---|
| 9,470,290 B2 | 10/2016 | Hoffmann |
| 2006/0104596 A1 | 5/2006 | Askins |
| 2008/0280689 A1 | 11/2008 | Mazziotti |
| 2010/0139646 A1* | 6/2010 | Barsun .................... F24J 2/541 126/600 |
| 2011/0139145 A1* | 6/2011 | MacKamul .............. F24J 2/541 126/600 |
| 2011/0240006 A1* | 10/2011 | Linke ....................... F24J 2/541 126/600 |
| 2011/0253195 A1 | 10/2011 | Kim |
| 2016/0195156 A1 | 7/2016 | Roses |

\* cited by examiner

TORQUE COUPLER AND SUPPORT POINT

STATEMENT OF GOVERNMENT INTEREST

Federally-Sponsored Research and Development

The United States Government has ownership rights in this invention. Licensing inquiries may be directed to Office of Research and Technical Applications, Space and Naval Warfare Systems Center, Pacific, Code 72120, San Diego, Calif., 92152; telephone (619)553-5118; email: ssc_pac_t2@navy.mil. Reference Navy Case No. 102,704.

BACKGROUND OF THE INVENTION

Field of Invention

This disclosure relates to solar energy, and more particularly, to a torque coupler and support point for reflectors in a solar energy collection system.

Description of Related Art

Solar energy collection has become increasingly important. Solar energy is beneficial in that it does not require the use of the world's limited natural resources. Solar energy is also beneficial because it may be used to generate electricity with fewer environmental consequences than other media for generating electricity.

A variety of systems have been devised for the collection and utilization of solar energy. While many of these systems are quite efficient in accomplishing the objective, i.e. collecting and storing solar energy to supplement or replace more expensive systems utilizing common sources of energy, one primary problem remains. That problem is the initial cost of making and installing an efficient solar energy collecting system. If a solar energy collecting system is very expensive to make and install, such high capital expenditure is undesirable, since the potential user must wait too long to amortize this cost before realizing any savings in energy expense.

It is well known that solar energy may be converted into other useful forms of energy by using proper techniques. For example, solar energy may be converted into electrical energy by a so-called solar cell. The most common solar cells are made of silicon, but cells made of other materials, e.g., cadmium sulfide and gallium arsenide, have also been developed and tested. The required voltage and/or amperage may be generated using an appropriate series-parallel matrix in an integrated array.

A principal obstacle in the current state of the art to wide scale adoption of solar cell energy collector installations is that manufacturing and installation costs of solar cell arrays generally are substantially higher than the cost of conventional electrical energy generating installations. Another factor limiting wide spread adoption of solar panel cells is radiant heating of the cells which reduces cell efficiency.

While the cost of manufacturing the solar cells per se currently is the single largest cost factor in the manufacture of a solar cell energy collector installation, any technique which increases the overall efficiency of a solar cell energy collector, or which reduces the cost of manufacturing and/or installing a solar cell energy collection system may have significant commercial importance.

In addition to the photoelectric conversion technique just described, it is well known that solar energy may be converted to other more useful forms of energy through thermal conversion techniques. Typically thermal conversion techniques involve using sunlight to heat up a liquid or gas contained in a thermal converter enclosure and then utilizing the heated liquid or gas in an appropriate manner well known to one skilled in the art to generate power.

However, as in the case of solar cells, relatively low energy collection efficiency, relatively high cost of manufacturing and relatively high installation costs have presented a principal obstacle to wide scale adoption of solar thermal energy collectors. Thus, any technique which increases the overall efficiency of a solar thermal energy collector of which reduces the cost of manufacturing and/or installing a solar thermal energy collector system may have significant commercial importance.

One technique the art has developed to increase efficiency of solar cells and thermal converters is to collect and focus solar energy onto the solar cells or thermal converters by means of a so-called "solar concentrator". Thus a typical solar energy collection system may include reflective or refractive devices which are designed to collect solar energy impinging upon a relatively large area and to focus the collected energy onto a relatively small area of utilization.

With respect to these reflectors, problems have been encountered in making them at a reasonable cost. Moreover, prior art reflectors tend to be heavy. There is a need for a reflector used in solar energy collection that is lightweight and reduced cost.

In the prior art, shaft couplers are available for coupling one shaft to another shaft for mirrors in a reflector assembly. However, these shaft couplers do not permit the mirrors to be turned over in the case of inclement weather. Moreover, torque may be lost in getting torque from one mirror to the next.

There is a need for a torque coupler that permits mirrors in a solar energy system to be turned over in inclement weather. There is further a need for a torque coupler that minimizes torque loss between mirrors.

BRIEF SUMMARY OF INVENTION

The present disclosure addresses the needs noted above by providing a torque coupler and support point for reflectors in a solar energy collection system. The torque tube coupler and support point comprises a first torque tube coupler assembly that is configured to be connected to a first reflector in a solar energy collection system. The torque tube coupler and support point also comprises a second torque tube coupler assembly that is configured to be connected to a second reflector in a solar energy collection system.

The torque tube coupler and support point still further comprises a support point that supports said first torque coupler assembly and said second torque tube coupler assembly. The support point includes a rigid shaft that facilitates a rigid connection of the first torque tube coupler assembly to the second torque tube coupler assembly.

The support point also includes a stand tube configured to support the weight of the torque tube coupler and support point, and a bearing stake mounted onto the stand tube. A bearing is mounted on the bearing stake. The bearing is configured to facilitate rotational freedom of three hundred sixty degrees for the first reflector and the second reflector. The torque tube coupler and support point is configured to cause movement of one of the first and second reflectors to substantially correspond to movement of the other of the first and second reflectors.

These, as well as other objects, features and benefits will now become clear from a review of the following detailed description, the illustrative embodiments, and the accompanying drawings.

BRIEF DESCRIPTION OF DRAWINGS

The accompanying drawings, which are incorporated in and form a part of the specification, illustrate example embodiments and, together with the description, serve to explain the principles of the torque coupler and support point. In the drawings.

DETAILED DESCRIPTION OF THE INVENTION

The present disclosure is directed to a torque coupler support point for use with mirrors or other reflectors in solar energy collectors. The torque coupler and support point permits mirrors or other reflectors in a solar energy collector to rotate essentially without restriction. Using this present torque coupler and support point, these reflectors may have rotational freedom across three hundred sixty degrees (360°). Thus, the mirrors or other reflectors may be turned to any angle. For example, where the reflectors are mirrors, the somewhat fragile mirrors may be completely flipped over in the case of inclement weather, e.g., hailstorms, in order to avoid destruction of the mirrors. This ability to rotate the glass mirrors as described herein permits inexpensive, widely available glass mirrors to be used as reflectors in a number of different situations. For purposes of the present disclosure, the term "reflector" includes mirrors.

The torque coupler and support point described herein couples to a shaft and supports the ends of the reflectors with a bearing. The bearing permits 360° of rotation by each reflector. When one reflector moves, the torque coupler and support point translates that movement to the other reflector on the other side of the bearing. Thus, the torque tube coupler and support point is configured to cause movement of one reflector to substantially correspond to movement of the other reflector. The torque coupler and support point described herein provides continuously variable control over a position of the first reflector relative to a position of the second reflector. Likewise, the torque coupler and support point described herein provides continuously variable control over a position of the second reflector relative to a position of the first reflector. In other words, movement translates from one reflector to another because the components of the torque coupler and support point are rigid. In fact, the angles of two coupled reflectors may be essentially the same and may be within ¼° to 1° of each other. In this manner, a long train or sequence of reflectors may be aligned and driven from one end.

Figure 1:
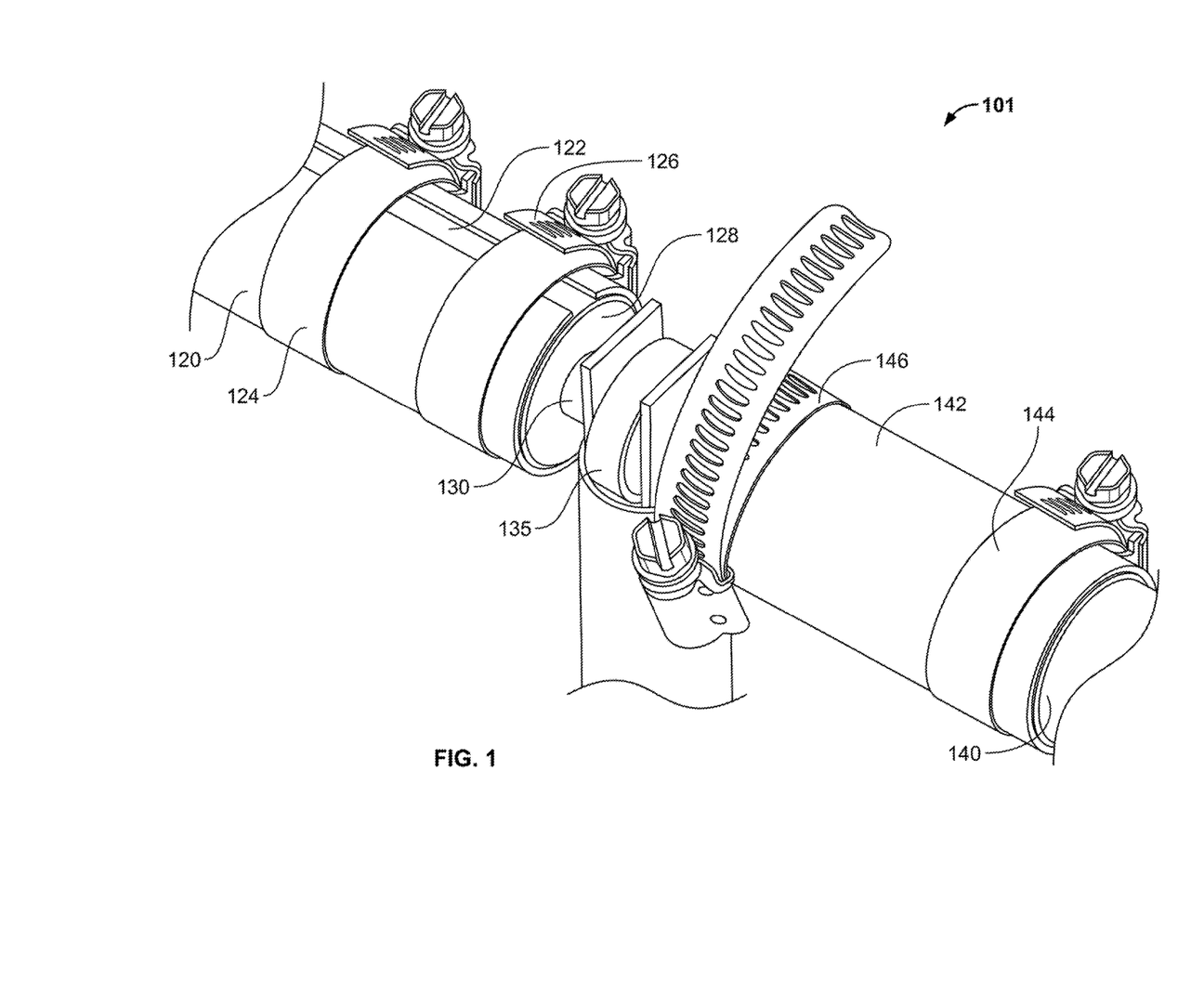
FIG. 1 shows an isometric view of a torque coupler and support point for rigidly connecting a first torque tube to a second torque tube, in accordance with one embodiment of the present disclosure.

FIG. 1 shows an isometric view of a torque coupler and support point 101 for rigidly connecting a first torque tube 120 to a second torque tube 140. The torque coupler and support point 101 comprises a first sleeve 122, a first outer clamp 124, a first inner clamp 126, a first disk 128, a shaft 130, a bearing 135, a second sleeve 142, a second outer clamp 144 and a second inner clamp 146. A second disk (not shown) is not visible from this isometric view. The first sleeve 122 and the second sleeve 142 provide adjustability to the relative angle(s) of the mirrors.

The first outer clamp 124 provides a gripping force or adjustably fastens around the first sleeve 122 and the first torque tube 120. The first inner clamp 126 may be adjustably fastened or provide a gripping force around the first sleeve 122 and the first disk 128. Outer clamp 124 and inner clamp 126 may be hose clamps that permit adjustable fastening by tightening or loosening the belt of either the outer clamp 124 or the inner clamp 126. As for the connection between the first sleeve 122 and first disk 128, a gripping force may be provided by an interference fit between the first sleeve 122 and the first disk 128.

The shaft 130 is tightly gripped by the first disk 128 and the second disk (not shown in FIG. 1). The tight grips on the shaft 130 by first disk 128 and second disk (not shown in FIG. 1) may also be provided by an interference fit. As used herein, an "interference fit" may be accomplished between a first and second object because the external dimension of the first object slightly exceeds the internal dimension of the second object. An "interference fit" may be accomplished between, e.g., first disk 128 or second disk (not shown) and shaft 130 because the outer circumference of the shaft 130 slightly exceeds the inner circumference of the first disk 128 and/or second disk (not shown in FIG. 1). Alternatively, the tight grip may be provided by a slide fit which is made tight by use of any commercially available adhesive, preferably one that includes an acrylic resin such as cyanoacrylate, to form almost instant bonds. The second outer clamp 144 may provide a gripping force or adjustably fasten around the second sleeve 142 and the second torque tube 140. The second inner clamp 146 may provide a gripping force or adjustably fasten around the second sleeve 142 and the second disk (not shown in FIG. 1). The second inner clamp 146 should be able to handle at least ten foot-pounds (10 ft-lbs) of force, and preferably, higher than thirty foot-pounds (30 ft-lbs) of force.

First torque tube 120 is firmly attached to a support structure for a first reflective element (not illustrated) of a solar concentrator system. Similarly, second torque tube 140 is firmly attached to a support structure for a second reflective element (not illustrated) of a solar concentrator system.

Figure 2:
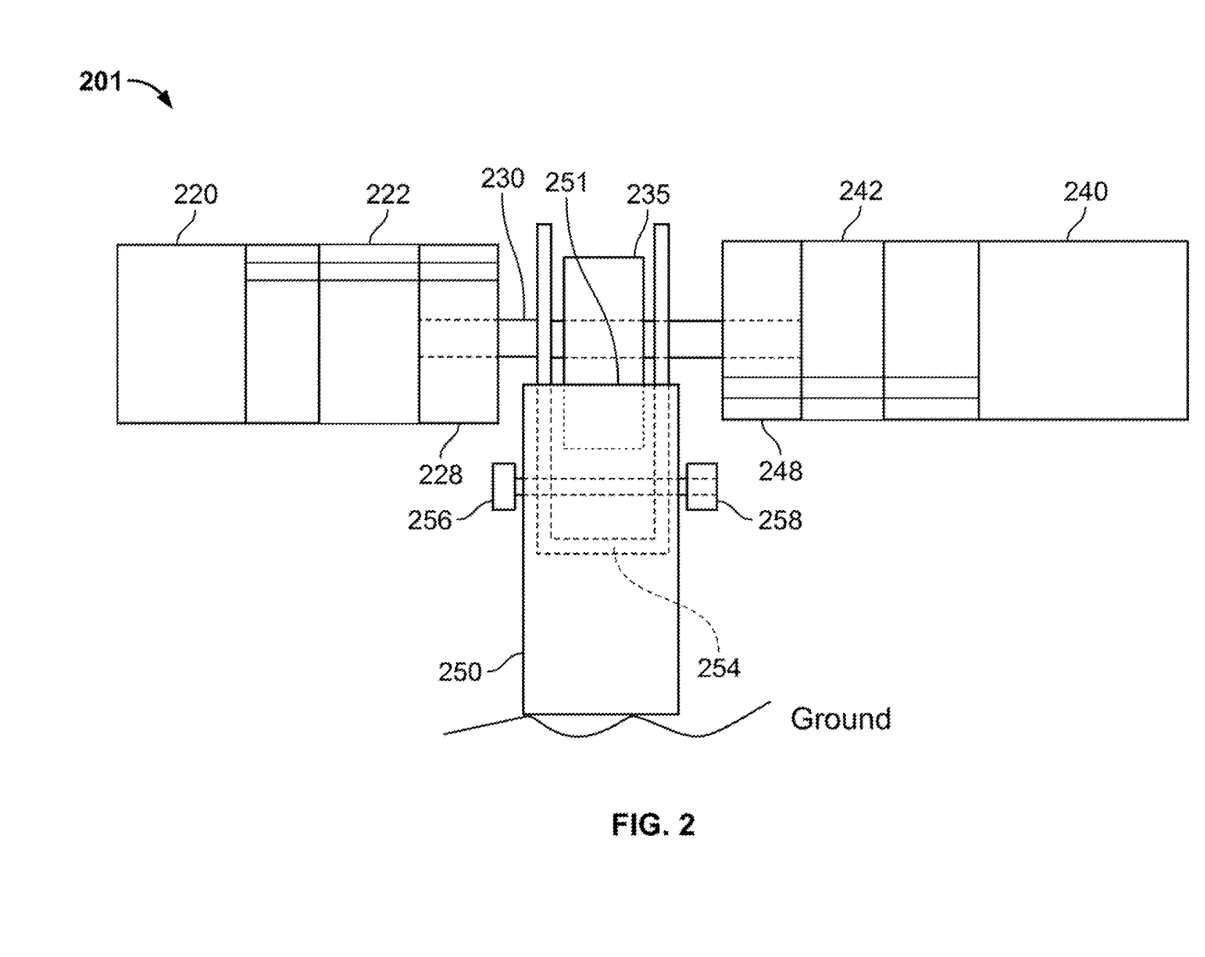
FIG. 2 shows a schematic side view of a torque coupler and support point for rigidly connecting a first torque tube to a second torque tube, in accordance with one embodiment of the present disclosure.

FIG. 2 shows a schematic side view of a torque coupler and support point for rigidly connecting a first torque tube to a second torque tube. The rigid connection is made by the parts of the torque coupler and support point 201 that are firmly attached to each other, to make essentially one solid object which is itself, stiff. First torque tube 220 is shown to the left of FIG. 2. The torque coupler and support point 201 comprises, a first sleeve 222, a first outer clamp (not shown in FIG. 2), a first inner clamp (not shown in FIG. 2), a first disk 228, a shaft 230, a bearing 235, a second sleeve 242, a second outer clamp (not shown in this FIG. 2), a second inner clamp (not shown in FIG. 2), and a second disk 248.

The first sleeve 222, first outer clamp (not shown in FIG. 2), first inner clamp (not shown in FIG. 2), and first disk 228 are sometimes referred to hereinafter as a first torque tube coupler assembly.

Second torque tube 240 is shown to the right of FIG. 2. The second torque tube coupler assembly is essentially a mirror image of the first torque tube coupler assembly. The second sleeve 242, second outer clamp (not shown in this FIG. 2), second inner clamp (not shown in FIG. 2), and second disk 248 are sometimes referred to hereinafter as a second torque tube coupler assembly. Shaft 230 is rigid, and thus facilitates a rigid connection between the first torque tube coupler assembly and the second torque tube coupler assembly.

As part of the support point portion of the torque tube coupler and support point 201, FIG. 2 also shows a bearing 235, a stand tube 250, an upper rim 251 of stand tube 250, a bearing stake 254, a retaining bolt 256 and a retaining nut 258. In FIG. 2, stand tube 250 supports and bears the weight and all lateral forces (e.g., from wind) that are impressed on the torque tube coupler and support point 201 by the reflective elements that it supports. In the illustration of FIG. 2, stand tube is supported by the ground. As shown, ground need not be completely flat in order to support stand tube 250. It should be understood that, in lieu of ground, stand tube 250 could be supported by a number of different surfaces, including a rooftop mount. The bearing 235 is mounted on bearing stake 254, which has two holes, through which the shaft 230 passes.

The bearing stake 254 is a strip of material, possibly metal (e.g., either galvanized steel, when cost is paramount, or aluminum when weight is most important), bent in the shape of a "U" to surround the bearing 235. The tops of the bearing stake 254 are shown to the right and left of the bearing 235, and extend beyond the height of the bearing 235. The bearing stake 254 holds onto the bearing 235 with a really good grip; however, on the other hand, beneficially, the bearing stake 254 has some degree of freedom so that it does not slide around the stand tube 250. The bearing 235 sits on an upper rim 251 of the stand tube 250 and thereby transmits primarily vertical loads, but also lateral loads.

The bearing stake 254 permits the bearing 235 to be self-aligned with the bearing stake 254. The bearing 235 is constrained in the center of the stand tube 250, thus providing rotational freedom to both reflectors (not shown) to which the torque tube coupler and support point 201 may be attached. Alignment between the bearing 235 and bearing stake 254 is important because, as a general matter, when a bearing 235 is mounted somewhat out of alignment, premature failure can occur. The bearing stake 254 can rotate around a vertical axis, but there is also a bit of freedom horizontally to provide support against lateral forces when the torque coupler and support point is in use. As seen in FIG. 2, there is a small amount of space between the bearing 235 and bearing stake 254.

If the mirror or other reflective element to which the torque tube coupler and support point 201 is attached is two feet wide and eight feet long, the stand tube 250 should be at least one foot tall. When the attached mirrors or other reflectors are vertical, they may hit the ground if stand tube 250 is not at least half the width of the biggest mirror in the solar collector assembly (not shown in FIG. 2). In one embodiment, the mirror may be twenty-one inches (21") from the ground. Stand tube 250 may be as small as one foot (1') wide for a solar collector assembly that incorporates mirrors that measure two feet (2') by eight feet (8'). These relatively small components contribute to the cost-effectiveness of the system.

The torque coupler and support point 201, also optionally can comprise a retaining bolt 256 and retaining nut 258. When this option is installed the torque coupler and support point 201 is capable of resisting higher levels of lateral loads. The retaining bolt 256 is inserted through the bearing stake 254 and is secured by retaining nut 258.

Figure 3A:
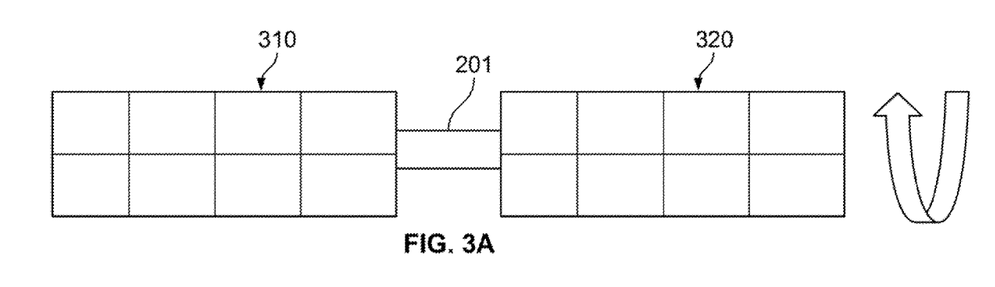
FIGS. 3A-3C show various angular positions for the reflectors that are rigidly coupled by the torque coupler and support point.
Figure 3B:
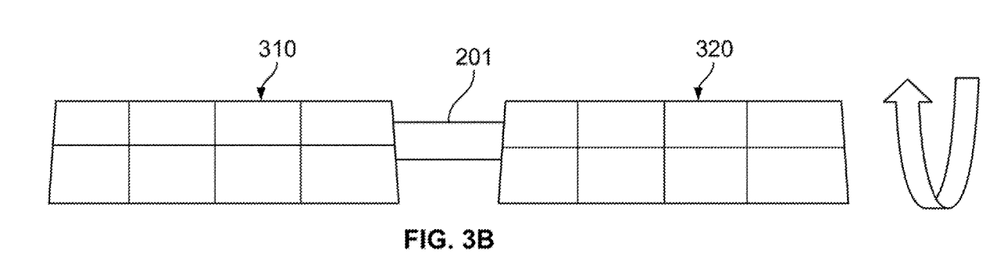
Figure 3C:
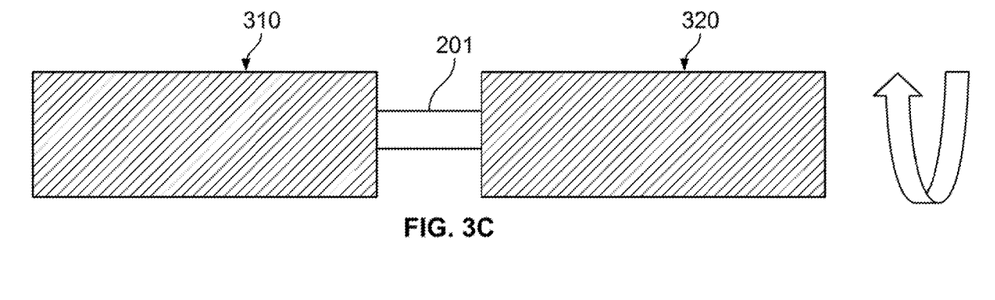

FIGS. 3A-3B show a top view of two reflectors at different angles, the reflectors being rigidly coupled by the torque tube coupler and support point 201 of the present disclosure. In FIG. 3A, reflector 310 is joined to reflector 320 by torque coupler and support point 201. In FIG. 3A, the reflectors 310, 320 are turned sunny side up so that they can directly face the overhead midday sun. In FIG. 3B, the reflectors 310, 320 are being turned in essentially lock-step due to the torque coupler and support point 201 of the present disclosure. In FIG. 3C, the reflectors 310, 320 are completely flipped over. Turning the reflectors completely over may be desirable to protect fragile reflectors such as conventional mirrors in the event of inclement weather. After the reflectors 310, 320 have been completely flipped over, rotation may continue in the same direction to turn them sunny side up again, e.g., when better weather returns.

Figure 4:
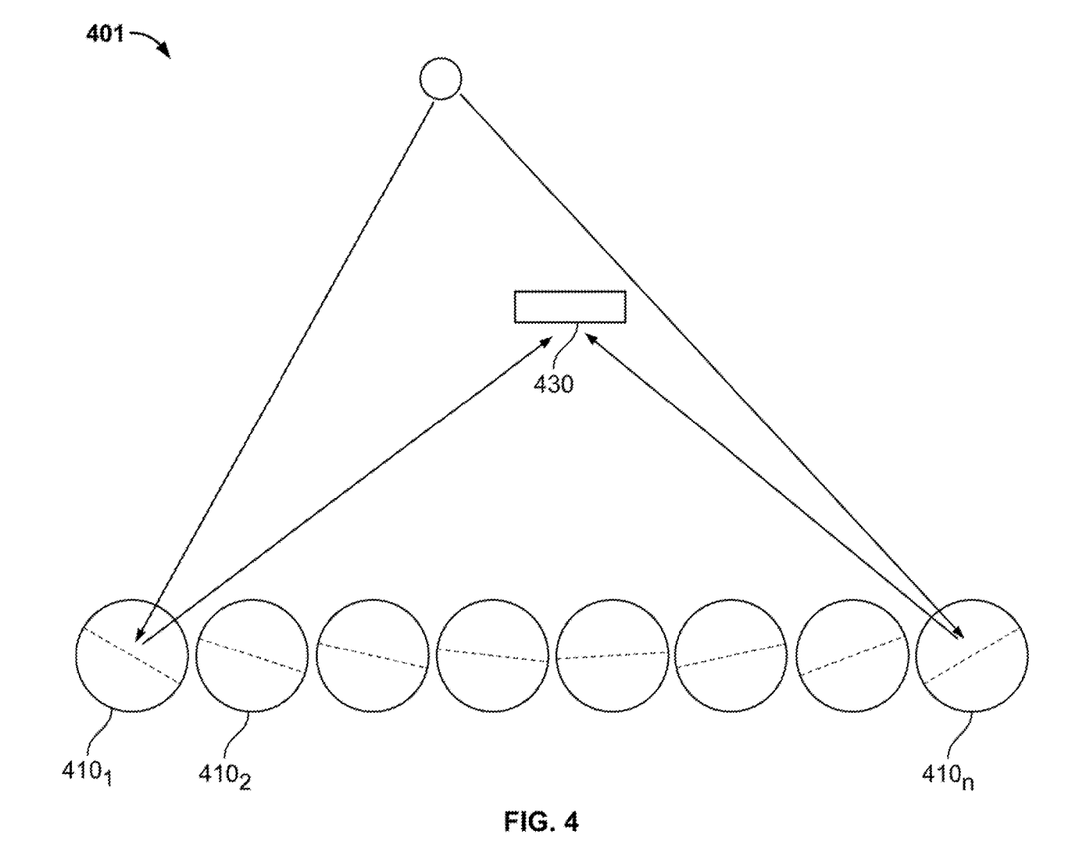
FIG. 4 illustrates a diagram of a reflector system that comprises a set of ground mounted reflectors that are arrayed in parallel.

FIG. 4 illustrates a diagram of a reflector system 401 that comprises a set of ground mounted reflectors $410_1$, $410_2$, through $410n$, that are arrayed in parallel. The reflectors $410_1$, $410_2$, through $410_n$ may be driven collectively or individually, to track movement of the sun relative to the earth. The reflectors orientated to reflect incident solar radiation to a receiver 430.

Figure 5:
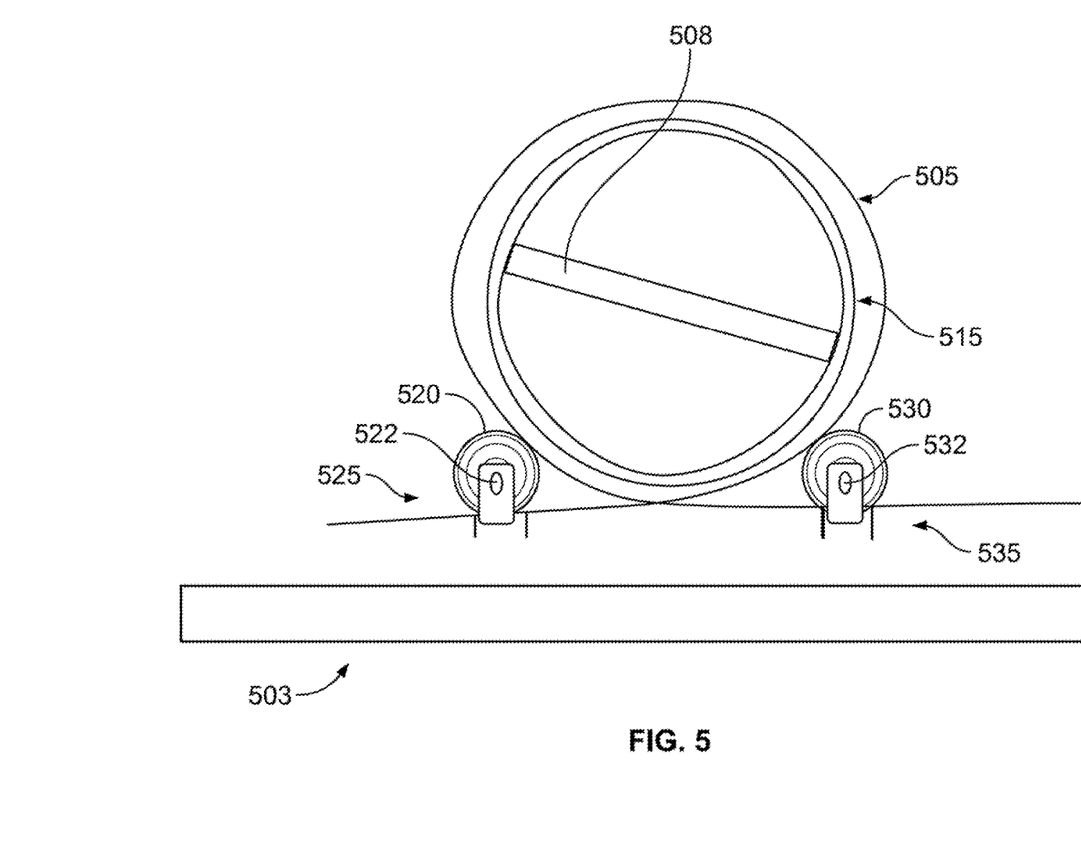
FIG. 5 shows an end, cross-sectional view of a portion of a drive/tracking system which can be utilized with the torque tube coupler and support point described herein.

FIG. 5 shows an end, cross-sectional view of a portion of a drive/tracking system that can be utilized with the torque tube coupler and support point described herein.

In FIG. 5, a rim 515 is supported on rollers 520 and 530. The rim 515 is in contact with housing 508. The rollers 520 and 530 are parts of a first set of casters 525 and 535 respectively and supported by axles 522 and 532 respectively. Note that cable loop 505 wraps around the rim 515 and under both axles 522 and 532. This preferred routing of the cable loop 505 ensures that rim 515 will remain located (held down) during a high wind gust. The first set of casters 525, 535 are affixed to the top portion of elongated support member 503. A second set of casters (not shown in FIG. 5) could be affixed at the top of rim 515 with another elongated support member (not shown) to provide still further support. It should be understood that the cable loop 505 is completely wrapped around the rim 515 to provide a gripping action, which enables controlled rotation of the rim 515 (and the housing 508), thereby minimizing or eliminating translational movement.

The reflectors used with the torque tube coupler and support point described herein may be moved by one or more motors. However, using the present torque tube coupler and support point, a motor is not required for every reflector. Numerous reflectors can be moved at the same time, and the reflectors may be rotatable around a three hundred sixty degree (360°) angle. The reflectors that may be used with the torque tube coupler and support point described herein may be used not only for solar energy collection. The reflectors can also be used in large arrays in order to bounce radio waves for signals.

Figure 6:
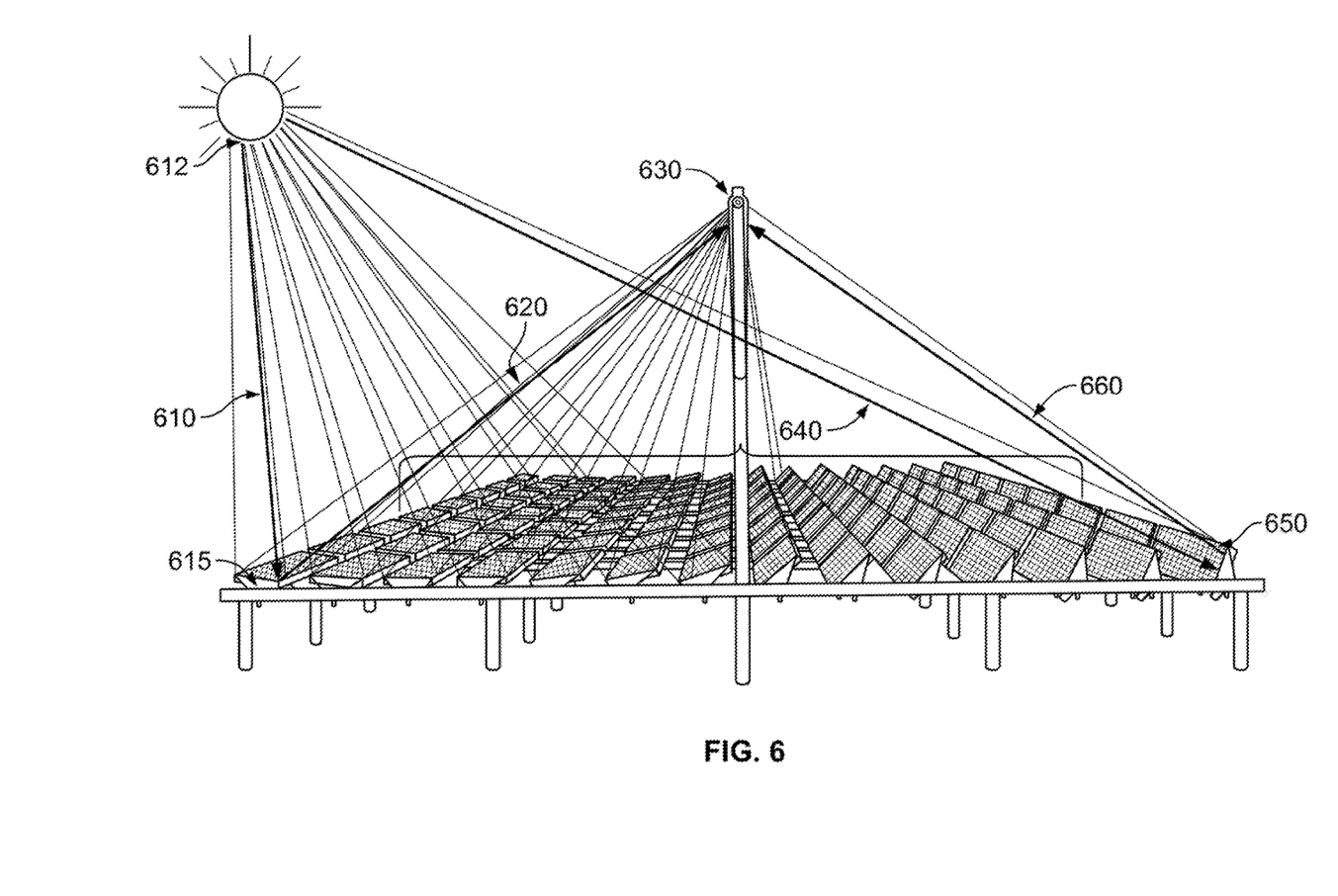
FIG. 6 is an example of an overall optical architecture of a solar energy collection system that can incorporate the torque coupler and support point of the present disclosure.

FIG. 6 illustrates an example of an overall optical architecture of a system which can incorporate the torque coupler and support point of the present disclosure. In FIG. 6, torque coupler and support point 201 may couple any two of the reflectors in the reflector array shown in FIG. 6. In the manner, an entire train of reflectors may be driven based on the motion of a single reflector. As shown, a light beam 610 from the sun 612 reflects from reflector 615 in the reflector array. The light beam 610 is then reflected from reflector 615 to form reflected light beam 620, which travels to receiver 630. The reflected light beam 620 is focused or concentrated along the way. Similarly, other light beams (not labeled) are reflected onto each reflector. For example, light beam 640 is reflected onto reflector 650 to which torque coupler and support point 201 is coupled. Reflector 650 may have a torque tube to which torque coupler and support point 201 is coupled. Reflected light beam 660 is concentrated onto receiver 630. Other reflected light beams (not labeled) are also concentrated onto receiver 630 from the reflector array.

In the embodiments described herein, the torque coupler and support point is described in terms of mirrors or other reflectors that are used in a solar energy collection system. However, it should be understood that these mirrors/reflectors could also be a part of a system used to reflect radio signals. For example, the torque coupler and support point could be used to bounce radio waves (e.g., electromagnetic radiation, microwaves, millimeter waves and light waves).

The foregoing description of various embodiments has been presented for purposes of illustration and description. It is not intended to be exhaustive or to limit the invention to the precise forms disclosed, and obviously many modifications and variations are possible in light of the above teaching. The example embodiments, as described above, were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A torque coupler for reflectors in a solar energy collection system, comprising:
   a first torque tube coupler assembly that is configured to be connected to a first reflector in said solar energy collection system;
   a second torque tube coupler assembly that is configured to be connected to a second reflector in said solar energy collection system;
   a support point that supports said first torque coupler assembly and said second torque tube coupler assembly, said support point being disposed between said first torque coupler assembly and said second torque tube coupler assembly via a rigid shaft that facilitates a rigid connection of the first torque tube coupler assembly to the second torque tube coupler assembly, wherein said support point includes:
      a stand tube configured to support a weight of the torque coupler;
      a bearing stake mounted onto the stand tube;
      a bearing mounted on the bearing stake, wherein the bearing is configured to facilitate rotational freedom of three hundred sixty degrees for the first reflector and the second reflector, and
   wherein the torque coupler is configured to cause movement of the one of the first and second reflectors to substantially correspond to movement of the other of the first and second reflectors.

2. The torque coupler of claim 1, wherein the first torque coupler assembly includes:
   a first sleeve configured to be disposed around a circumference of a first torque tube that is connected to the first reflector in the solar energy collection system;
   a first disk disposed around a circumference of the shaft;
   a first outer clamp disposed around a circumference of the first sleeve and the first disk, the first outer clamp being configured to adjustably fasten around the first sleeve; and
   a first inner clamp configured to adjustably fasten around the first sleeve and the first disk.

3. The torque coupler of claim 1, wherein the second torque coupler assembly includes:
   a second sleeve configured to be disposed around a circumference of a second torque tube that is connected to the second reflector in the solar energy collection system;
   a second disk disposed around a circumference of the shaft;
   a second outer clamp disposed around a circumference of the second sleeve and the second disk, the second outer clamp being configured to adjustably fasten around the second sleeve; and
   a second inner clamp configured to adjustably fasten around the second sleeve and the second disk.

4. The torque coupler of claim 1, wherein the stand tube is composed of galvanized steel or aluminum.

5. The torque coupler of claim 1, further comprising:
   a retaining bolt configured to secure the bearing stake to the stand tube; and
   a retaining nut configured to secure the retaining bolt to the stand tube.

6. The torque tube coupler of claim 1, wherein the first reflector and the second reflector are arrayed in parallel in a reflector system for the solar energy collection system.

7. The torque coupler of claim 1, wherein the stand tube is further configured to provide support against lateral forces.

8. A torque coupler for reflectors in a solar energy collection system, comprising:
   a first torque tube coupler assembly that includes:
      a first sleeve configured to be disposed around a circumference of a first torque tube that is configured to be connected to a first reflector in said solar energy collection system;
      a first disk disposed around a circumference of a shaft;
      a first outer clamp disposed around a circumference of the first sleeve and the first disk, the first outer clamp being configured to adjustably fasten around the first sleeve;
      a first inner clamp configured to adjustably fasten the first sleeve to the first disk;
   a second torque tube coupler assembly that includes:
      a second sleeve configured to be disposed around a circumference of a second torque tube that is configured to be connected to a second reflector in said solar energy collection system;
      a second disk disposed around the circumference of the shaft;
      a second outer clamp disposed around a circumference of the second sleeve and the second disk, the second outer clamp being configured to adjustably fasten around the second sleeve,
      a second inner clamp configured to adjustably fasten the second sleeve to the second disk;
   a support point that includes:

a stand tube configured to support a weight of the first torque tube coupler assembly and second torque tube coupler assembly;
a bearing stake mounted onto the stand tube;
a bearing mounted on the bearing stake, wherein the bearing is configured to facilitate normal rotational freedom of three hundred sixty degrees for the first reflector and the second reflector;
wherein the torque tube coupler is configured to cause movement of the one of the first and second reflectors to substantially correspond to movement of the other of the first and second reflectors.

9. The torque coupler of claim 8, wherein the first and second disks are disposed around the circumference of the shaft via an adhesive.

10. The torque coupler of claim 8, wherein the stand tube is composed of galvanized steel or aluminum.

11. A torque coupler for reflectors in a solar energy collection system, comprising:
a first torque tube coupler assembly that includes:
a first sleeve configured to be disposed around a circumference of a first torque tube that is configured to be connected to a first reflector in said solar energy collection system, wherein the first reflector is a part of a reflector array;
a first disk disposed around a circumference of a shaft;
a first outer clamp disposed around a circumference of the first sleeve and the first disk, the first outer clamp being configured to adjustably fasten around the first sleeve;
a first inner clamp configured to adjustably fasten the first sleeve to the first disk;
a second torque tube coupler assembly that includes:
a second sleeve configured to be disposed around a circumference of a second torque tube that is configured to be connected to a second reflector in said solar energy collection system, wherein the second reflector is part of a reflector array;
a second disk disposed around the circumference of the shaft;
a second outer clamp disposed around a circumference of the second sleeve and the second disk, the second outer clamp being configured to adjustably fasten around the second sleeve,
a second inner clamp configured to adjustably fasten the second sleeve to the second disk;
a support point that includes:
a stand tube configured to support a weight of the first torque tube coupler assembly and second torque tube coupler assembly, wherein the stand tube is further configured to provide support against lateral forces when the torque coupler is in use;
a bearing stake mounted onto the stand tube;
a bearing mounted on the bearing stake, wherein the bearing is configured to facilitate rotational freedom of three hundred sixty degrees for the first reflector and the second reflector;
a retaining bolt configured to secure the bearing stake to the stand tube; and
a retaining nut configured to secure the retaining bolt to the stand tube, and
wherein the torque tube coupler is configured to cause movement of one reflector in the reflector array to substantially correspond to movement of another reflector in the reflector array.

12. The torque coupler of claim 11, wherein the first and second disks are disposed around the circumference of the shaft via an adhesive.

13. The torque coupler of claim 11, wherein the stand tube is composed of galvanized steel or aluminum.

14. The torque coupler of claim 11, wherein the stand tube is further configured to provide support against lateral forces when the torque coupler and support is in use.

* * * * *